July 14, 1953  A. D. ROBBINS  2,645,150
COLLIMATING OPTICAL SIGHT
Filed Feb. 15, 1951  2 Sheets-Sheet 1

INVENTOR.
Azor D. Robbins

July 14, 1953 A. D. ROBBINS 2,645,150
COLLIMATING OPTICAL SIGHT
Filed Feb. 15, 1951 2 Sheets-Sheet 2

INVENTOR.
Azor D. Robbins

Patented July 14, 1953

2,645,150

UNITED STATES PATENT OFFICE 2,645,150

COLLIMATING OPTICAL SIGHT

Azor D. Robbins, Hempstead, N. Y.

Application February 15, 1951, Serial No. 211,046

5 Claims. (Cl. 88—2.4)

This invention relates to optical sights and is an improved form of my invention in Patent No. 2,492,888. The object of this invention is to provide an improved control means for movement of the reticle image, as seen by the sight operator in the combining glass.

A further object is to provide a tiltable mirror, within said sight, to cause movement of the reflected image and to provide means for tilting said mirror in a manner which will produce, in accurate increments, movement of the image in relation to degrees of rotation of shafts or members within said sight.

Another object is to reduce the size of the sight in relation to the size of lens used.

Another object is to provide a system of operation in which the moving parts will not be affected by vibration and shock.

Figure 1:
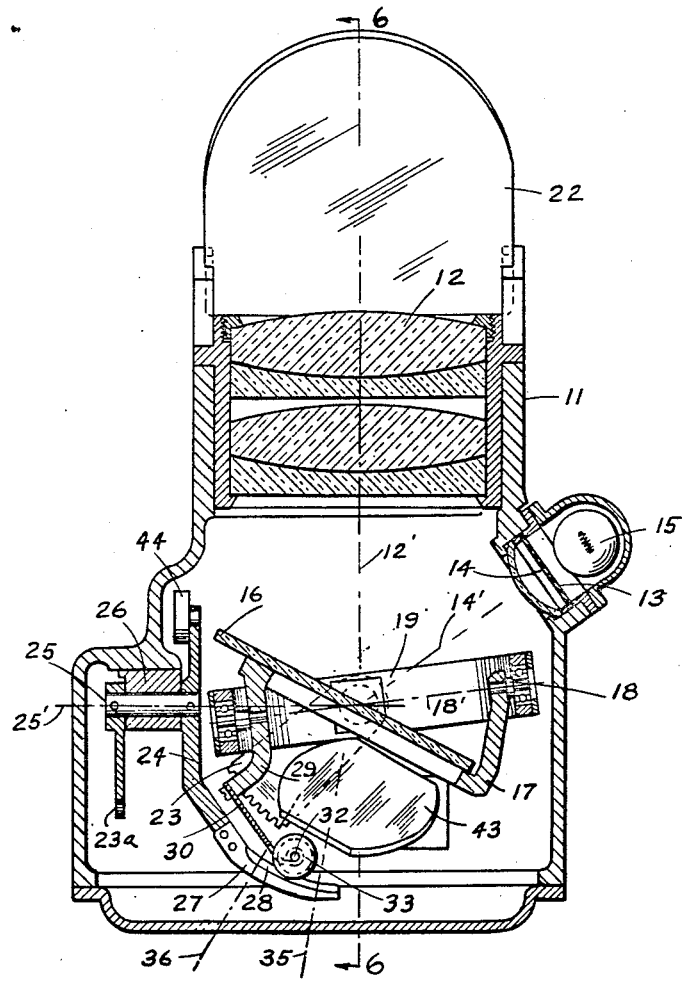
Figures 2, 3:
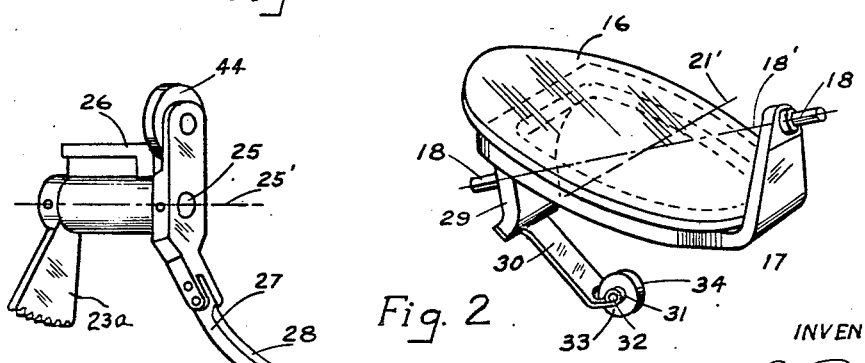
Figure 4:
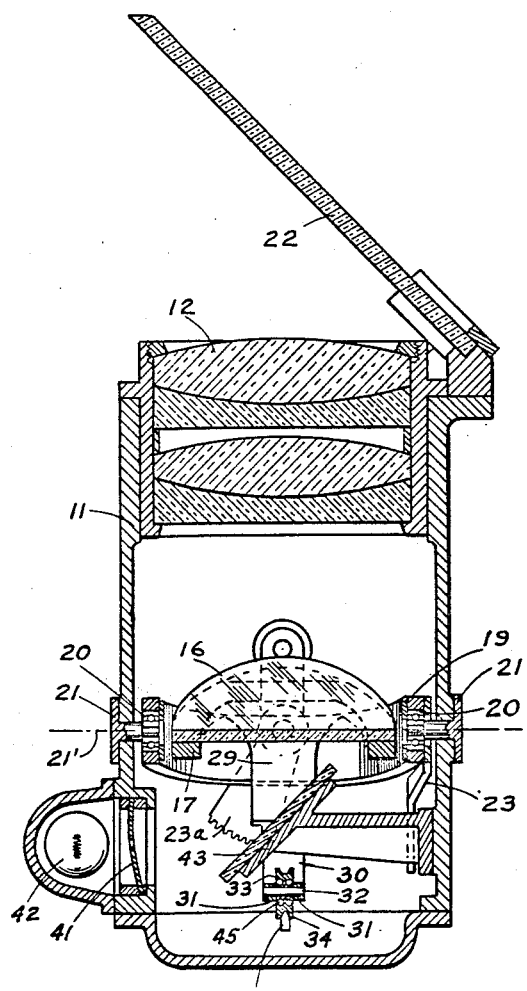
Figure 5:
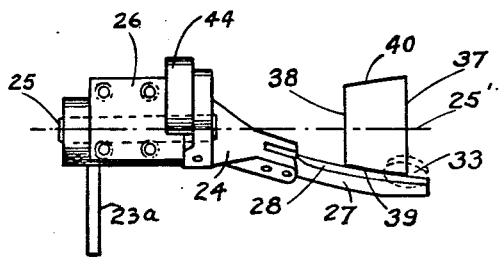

I attain these and other objects as will be apparent as the invention is described in detail and in connection with the accompanying drawings in which:

Figure 1 is a view in section on a vertical plane. Fig. 2 is a view showing the tiltable mirror and supporting frame. Fig. 3 is a view showing the control arm for moving the mirror. Fig. 4 is a view in section on line 6—6 of Fig. 1. Fig. 5 is a plan view of the control arm to illustrate movement of parts of the control system.

Referring to Fig. 1, the body 11 carries a lens 12 at its upper part. Adjacent the lens and at one side of the body is mounted a reticle 13 comprising a thin plate with a suitable opening 14 through which light from the light source 15 can be projected to the semi-transparent mirror 16. The mirror 16 is mounted on a frame 17 carried on pivots 18 journaled in the gimbal ring 19. The gimbal ring 19 carries antifriction bearings 20 which are supported on pivots 21 carried by the body 11.

It will be seen that light projected from the reticle opening 14 will be reflected by the mirror 16 through the lens 12 and in the normal position of said mirror the light will be reflected through the center of said lens. It will be also seen that the reflected light may be moved in relation to the lens by tilting the mirror, either by tilting the gimbal ring 19 on its pivots 21 or by tilting the mirror frame 17 on pivots 18.

Above the lens and at an angle is a transparent reflecting combining glass 22 in which the operator of the sight can see the target and the reflected image of the reticle. With the mirror 16 in the center of its angular travel, the reticle image appears in the center of the glass 22. Tilting the mirror, by moving the gimbal ring 19 on its pivots, will cause the image to move right or left.

By tilting the mirror frame 17 on its pivots 18 the image will be seen to move up or down.

The image will appear, in the combining glass, to be at infinity since the reticle is at a point where the added distance of the reticle from the mirror 16 and from the mirror to the lens, is equal to the focal length of the lens.

The objects of having a movable reticle image appearing in a combining glass are well known and need not be hereindescribed, but some of the difficulties in obtaining a uniform and regular pattern of reticle movement should be pointed out and the means by which a uniform pattern of movement is obtained by the present invention will be described.

It will be noted that the frame 17 supporting the mirror 16 is formed so that the line 18', through the axis of the pivots 18, is at a considerable angle in relation to the plane of the mirror. This angle has a certain relation to the angle formed by lines 12' and 14' between the lens and the reticle. By selecting the correct angle of the mirror in relation to the axis 18' the reticle image will be reflected in a manner which will cause the image to move in substantially straight paths, as seen in the combining glass.

To rotate the gimbal ring 19 on its pivots a toothed sector 23 is attached to the side of said gimbal ring. This sector is adapted for operation by any suitable servomechanism, not shown.

To rotate the mirror frame on its pivots 18, in the gimbal, an arm 24 is mounted on a shaft 25 positioned at the opposite side of the body to the reticle 13. The shaft 25 is supported by a bracket 26 attached to the body 11 and positioned where the axis of said shaft 25' intersects the axis of both gimbal pivots 21, as shown by line 21' and mirror frame pivots 18 as shown by line 18'. The arm 24 carries a finger 27 having arcuate surfaces 28 forming a radius the center of which is coincident with the center of the gimbal pivots 21. The mirror frame 17 has a downward extension 29 to carry a flat leaf spring 30. The spring 30 has eyes 31 formed at its lower end to receive a shaft 32 on which is mounted a flanged roller 33. The flanges 34 of said roller fit on the surfaces 28 which are in the form of an inverted V, as may be seen in Figures 3 and 4.

The spring 30 is set at an angle which will cause the flanges 34 of said roller to press firmly on said surfaces 28 and it will be therefore seen that when the gimbal is turned on its pivots, the spring 30 will provide a yieldable arm to carry roller 33 along the arcuate surfaces 28 but, in any position of the gimbal ring, rotation of shaft 25 and oscillation of finger 27 will, through roller 33 and spring 30, rotate the mirror frame on its axis, or pivots 18.

A toothed sector 23a is attached to shaft 25 to provide driving means for said shaft by any suitable servomotor or other driving means not shown.

In rotating the mirror and mirror frame on pivots 18, provision must be made to rotate it through varying degrees of rotation as the gimbal ring is moved through its range of angular travel. When the gimbal ring is tilted clockwise, as viewed in Fig. 1, and the mirror 16 is moved toward normal to the reticle, rotation of the mirror on pivots 18 will produce a greater angle of reflection or more apparent movement of the reticle image than the same angle of mirror rotation on pivots 18, when the gimbal ring is tilted counter-clockwise and the plane of the mirror is at a greater angle to the reticle. If no method of correction is provided, rotation of shaft 25, when the reticle image is at one side of the combining glass, would produce a longer vertical movement than at the other side of the combining glass, or a movement of the image in the form of a trapezoid instead of a rectangular figure.

To correct this condition the roller 33 and finger 27 are displaced from the central axis of the lens and the finger therefore extends in an arc less than ninety degrees from the axis of said shaft. When the roller is in the position shown at line 35 it is carried at a point on surface 28 which moves through a wider travel, for a given angle of rotation of shaft 25, than the travel of said surfaces at line 36.

This variation of finger travel may be further understood by reference to Fig. 5 where the travel of the finger is shown at line 37 which corresponds to the position of the roller being at line 35 in Fig. 1 and line 38 represents the travel of the roller at line 36 of Fig. 1. If the mirror is tilted in a manner to produce a rectangular pattern, as seen in the combining glass, the roller 33 will move in a trapezoidal pattern as outlined by lines 37, 38, 39 and 40 as seen in Fig. 5.

It is sometimes desirable for the sight operator to have a second and fixed reticle image appearing in the combining glass 22. This reticle 41 is positioned at one side of the sight body and is illuminated by light source 42. The image of reticle 41 is reflected by mirror 43, mounted on bracket 43', through semi-transparent mirror 16 to the lens 12 and glass 22. The light path, from the reticle 41 to the lens, has the same length as the light path from reticle 14 to the lens therefore both reticles are at the correct focal distance from the lens.

One of the advantages of this present invention is that by placing the arms 24 and finger 27 at one side of the center of the sight, it allows room for a comparatively large mirror 43.

In order to point out the advantages of this invention it is necessary to explain the disadvantages of the construction in the prior art as represented in Patent No. 2,492,888 which requires a vertically pivoted swinging arm, 19 in said patent, to control movement of the depending lever 15 from the mirror frame and in which said arm 19 provides a track for the ball 17. In practice it is necessary to make the swinging arm 19 of considerable length in relation to the size of the sight and consequently a large sight housing is necessary.

Another objectionable feature in said prior sight is that the ball 17 and roller 36 of said sight cannot be made free enough to move easily without allowing clearance for them between the cheeks 18 of the arm. This clearance causes the mirror to vibrate when the sight is subjected to vibration, also the various arms in said sight cannot be properly balanced by counter-weights and when said sight is subjected to vibration this unbalanced condition causes considerable disturbance of the mirror and reflected image.

The present invention overcomes these objections by using the arm 24 and shaft 25 which can be made much smaller than the arm 19 used in the prior construction and the arm 24 can be properly balanced by addition of the counterweight 44.

The finger 27 provides arcuate surfaces 28 on which the roller 33 can be firmly held by spring 30, thus avoiding the vibration of a free connection. The roller 33 may be mounted on ball bearings 45, thus making it possible to tilt the gimbal ring with a very small amount of force.

It is intended that the above description and drawings shall be considered in an illustrative and not in a limiting sense and many changes may be made without departing from the spirit of the invention as set forth in the following claims.

What I claim is:

1. In a sight unit, in combination, a housing body, a lens, an illuminated reticle, a tiltable mirror positioned to reflect light from said reticle through said lens, a gimbal ring pivoted in said body, a supporting frame for said mirror pivoted in said gimbal ring, a shaft mounted beside the gimbal ring and having its axis at right angles to and intersecting the axis of said gimbal ring pivots, an arm carried by said shaft, said arm terminating in a finger having arcuate guide surfaces each describing a radius with centers coincident with the axis of said gimbal pivots, a yieldable arm carried by said frame, a roller journaled on a shaft carried by said yieldable arm, said roller having a double flanged periphery, said flanges being held in rolling contact with said guide surfaces by pressure of said yieldable arm when said gimbal ring is tilted and said roller and said guide surfaces providing driving engagement whereby rotation of said shaft will also rotate said mirror frame on its supporting pivots.

2. In a sight unit, in combination, a housing body, a lens, an illuminated reticle, a tiltable mirror positioned to reflect light from said reticle through said lens, a gimbal ring pivoted in said body, a supporting frame for said mirror pivoted in said gimbal ring, a shaft mounted beside the gimbal ring and having its axis at right angles to and intersecting the axis of said gimbal ring pivots, an arm carried by said shaft, said arm terminating in a finger having arcuate guide surfaces each describing a radius with centers coincident with the axis of said gimbal pivots, a yieldable arm carried by said frame, a roller journaled on a shaft carried by said yieldable arm, said roller having a double flanged periphery, said roller flanges being held in rolling contact with said guide surfaces by pressure of said yieldable arm when said gimbal ring is tilted, said roller and said guide surfaces adapted to prevent angular movement of said mirror frame on its pivots when said gimbal is tilted with the guide surface held in its central position and said roller and said guide surfaces adapted to cause angular movement of said mirror frame on its pivots when said gimbal is tilted with the guide surfaces displaced from their central position by rotation of said shaft.

3. In a sight unit, in combination, a housing body, a lens, an illuminated reticle, a tiltable mirror positioned to reflect light from said reticle through said lens, a gimbal ring pivoted in said body, a frame supporting said mirror and pivoted in said gimbal ring, a shaft mounted beside the gimbal ring and having its axis at right angles to and intersecting the axis of said gimbal pivots, an arm carried by said shaft and said arm having an arcuate guide track describing a radius with its radius center coincident with the axis of said gimbal pivots, a flanged member carried by said mirror frame and adapted to movably engage said guide track, said guide track and said flanged member being adapted to rotate said mirror frame on its pivots when said shaft is rotated and said guide track and said flanged member adapted to control the angular position of said mirror frame on its pivots when said gimbal is tilted.

4. In a sight unit, in combination, a housing body, a lens, an illuminated reticle, a tiltable mirror positioned to reflect light from said reticle through said lens, a gimbal ring pivoted in said body, a frame supporting said mirror and pivoted in said gimbal ring, a shaft mounted beside the gimbal ring and having its axis at right angles to and intersecting the axis of said gimbal pivots, an arm carried by said shaft and said arm having a guide track describing a radius with its center coincident with the axis of said gimbal pivots, a track engaging member carried by said mirror frame to provide driving engagement between said frame and said guide track whereby rotation of said shaft will also rotate said frame in any tilted position of said gimbal, said track engaging member positioned to travel over an arc of circle between the axis of said shaft and a line normal to said shaft.

5. In a sight unit, in combination, a housing body, a lens, an illuminated reticle, a tiltable mirror positioned to reflect light from said reticle through said lens, a gimbal ring pivoted in said body, a frame supporting said mirror and pivoted in said gimbal ring, a shaft mounted beside the gimbal ring and having its axis at right angles to and intersecting the axis of said gimbal pivots, an arm carried by said shaft and said arm having an arcuate guide track describing a radius with its center coincident with the axis of said gimbal pivots, a roller mounted on a shaft carried by said frame, said roller having a double flanged periphery, the flanges of said roller engaging the arcuate guide track in rolling engagement whereby rotation of said shaft will also rotate said mirror frame in any tilted position of said gimbal, said roller positioned to travel over an arc of circle within the angle formed by the axis of said shaft and a line normal to said shaft.

AZOR D. ROBBINS.

References Cited in the file of this patent

UNITED STATES PATENTS

| Number | Name | Date |
|---|---|---|
| 2,492,888 | Robbins | Dec. 27, 1949 |